US011047571B2

(12) United States Patent
Baio et al.

(10) Patent No.: US 11,047,571 B2
(45) Date of Patent: Jun. 29, 2021

(54) SELF-RECUPERATIVE BURNER

(71) Applicant: ESA S.P.A., Curno (IT)

(72) Inventors: Andrea Baio, Treviolo (IT); Milco Dalfovo, Villa di Serio (IT)

(73) Assignee: ESA S.P.A., Curno (IT)

( * ) Notice: Subject to any disclaimer, the term of this patent is extended or adjusted under 35 U.S.C. 154(b) by 0 days.

(21) Appl. No.: 16/347,837

(22) PCT Filed: Oct. 13, 2017

(86) PCT No.: PCT/IB2017/056363
§ 371 (c)(1),
(2) Date: May 7, 2019

(87) PCT Pub. No.: WO2018/083559
PCT Pub. Date: May 11, 2018

(65) Prior Publication Data
US 2019/0264911 A1 Aug. 29, 2019

(30) Foreign Application Priority Data

Nov. 7, 2016 (IT) .................... 102016000111870

(51) Int. Cl.
*F23D 14/24* (2006.01)
*F23L 15/04* (2006.01)
*F23L 17/16* (2006.01)
(52) U.S. Cl.
CPC .............. *F23D 14/24* (2013.01); *F23L 15/04* (2013.01); *F23L 17/16* (2013.01); *Y02E 20/34* (2013.01)

(58) Field of Classification Search
CPC ............ F23D 14/24; F23L 15/04; F23L 17/16
USPC .................................................. 431/115–116
See application file for complete search history.

(56) References Cited

U.S. PATENT DOCUMENTS

| 2,294,024 | A | | 8/1942 | John et al. |
| 2,722,372 | A | | 11/1955 | Edwards et al. |
| 3,468,616 | A | | 9/1969 | Ward et al. |
| 4,210,411 | A | * | 7/1980 | Ward ..................... F23D 17/002 431/160 |
| 5,326,255 | A | * | 7/1994 | Wunning ................ F23C 3/002 431/215 |
| 7,163,392 | B2 | * | 1/2007 | Feese ...................... F23C 6/045 431/10 |
| 2011/0168065 | A1 | * | 7/2011 | Collier .................... F23C 7/008 110/160 |

FOREIGN PATENT DOCUMENTS

| CN | 86104491 A | 12/1986 |
| CN | 1912460 A | 2/2007 |
| CN | 101027522 A | 8/2007 |
| CN | 201363728 Y | 12/2009 |

(Continued)

*Primary Examiner* — Vivek K Shirsat
(74) *Attorney, Agent, or Firm* — King & Schickli, PLLC

(57) ABSTRACT

A self-recuperative burner comprising: a burner body having an exchanger; said exchanger comprises a first duct for the combustion air and a second duct for the flue gases: at least one first flue gas discharge pipe; characterized in that it comprises an air inlet duct leading to a first annular chamber concentric to said at least one first flue gas discharge pipe; said first annular chamber being connected also to a Venturi tube positioned inside said at least one first flue gas discharge pipe.

8 Claims, 4 Drawing Sheets

(56) References Cited

FOREIGN PATENT DOCUMENTS

| | | |
|---|---|---|
| CN | 101707938 A | 5/2010 |
| CN | 102183165 A | 9/2011 |
| CN | 102695917 A | 9/2012 |
| DE | 29923473 U1 | 9/2000 |
| EP | 1486728 A2 | 12/2004 |
| EP | 2255142 A1 | 12/2010 |
| KR | 20120070201 A | 6/2012 |

* cited by examiner

SELF-RECUPERATIVE BURNER

TECHNICAL FIELD

The present invention refers to a self-recuperative burner.

BACKGROUND

Currently self-recuperative burners have a main body into which combustion air and fuel are conveyed and out of which the flue gases flow.

The air and the flue gases in a self-recuperative burner are made to pass through ducts in opposite directions so that the combustion air heats before mixing with the fuel, with great benefits in terms of energy saving and combustion efficiency.

To discharge the flue gases, in view of the high-pressure losses on the exchanger, the burner on the flue gas side is provided with a Venturi ejector which creates a depression equal to the pressure losses along the exchanger, thus discharging 100% of the flue gases from the burner.

A pre-fitted component is therefore provided on the air line with a common inlet and two separate lines, one for the combustion air and one for the air supplying the ejector, with respective flow regulation valves.

This pre-fitted component, apart from representing a cost, since it is composed of pipe connections and valves that have to be assembled, also adds a considerable bulk to the outside of the burner. This bulk at times creates difficulties for the design engineers in design of the pipes on the combustion system, since they have to provide an extra space for housing the air inlet and for discharge of the flue gases.

SUMMARY

The object of the present invention is to provide a self-recuperative burner which is simpler to produce than those in the known art.

A further object is to provide a self-recuperative burner that has smaller overall dimensions than those in the known art.

A further object is to provide a self-recuperative burner that is lighter than those in the known art.

A further object is to provide a self-recuperative burner that has a greater heat exchange than those in the known art.

According to the present invention, said objects and others are achieved by a self-recuperative burner comprising: a burner body having an exchanger; said exchanger comprises a first duct for the combustion air and a second duct for the flue gases: at least one first flue gas discharge pipe; characterized in that it comprises a duct for the inlet of the air which leads to a first annular chamber concentric to said at least one first flue gas discharge pipe; said first annular chamber also being connected to a Venturi tube located inside at least one said first flue gas discharge pipe.

Further characteristics of the invention are described in the dependent claims.

This solution offers various advantages with respect to the solutions of the known art.

The new solution allows elimination of the bulk of the external pre-fitted component, by compacting the air regulation elements inside an air distribution valve.

This valve comprises the function of combustion air distributor and distributor of the air to the ejector in one single body.

As regards the quantity of ejection air, the regulation is obtained by acting on the adjusting screw which throttles the inlet of the ejector insert: the inlet surface variation increases or reduces the depression which the Venturi insert creates at the flue discharge outlet on the main body, increasing or reducing the percentage of flue gases extracted from the burner.

The combustion air is instead controlled by the modulating valve located on the line external to the burner: this air will instead enter the burner body in a volume concentric to that of the flue gas outlet. Being concentric to the flue pipe, there will already be a recovery of energy at the air inlet to the valve body. This increases burner efficiency since the heat exchange with the flue gases begins outside the burner body.

This further allows the elongation of the section inside the valve in order to increase the exchange surface and consequently the efficiency (for example with the aid of appropriate modules to be inserted between air inlet valve and main body of the burner, such as an additional metal exchanger, which recovers energy from the fumes that have already crossed the main exchanger).

The solution adopted entails two concentric bodies, made of different material, the inner one in heat-resistant steel so as not to require any protective insulation. The outer body can be made of lighter less heat-resistant materials, being in contact with the combustion air which is still cold. In this way the global efficiency of the burner increases as the inner body acts as heat exchanger: the combustion air that envelops it is pre-heated before coming into contact with the exchanger, to the benefit of the final pre-heating temperature.

BRIEF DESCRIPTION OF THE DRAWING FIGURES

The characteristics and advantages of the present invention will become evident from the following detailed description of a practical embodiment thereof, illustrated by way of non-limiting example in the accompanying drawings, in which.

DETAILED DESCRIPTION OF THE INVENTION

Figure 1:
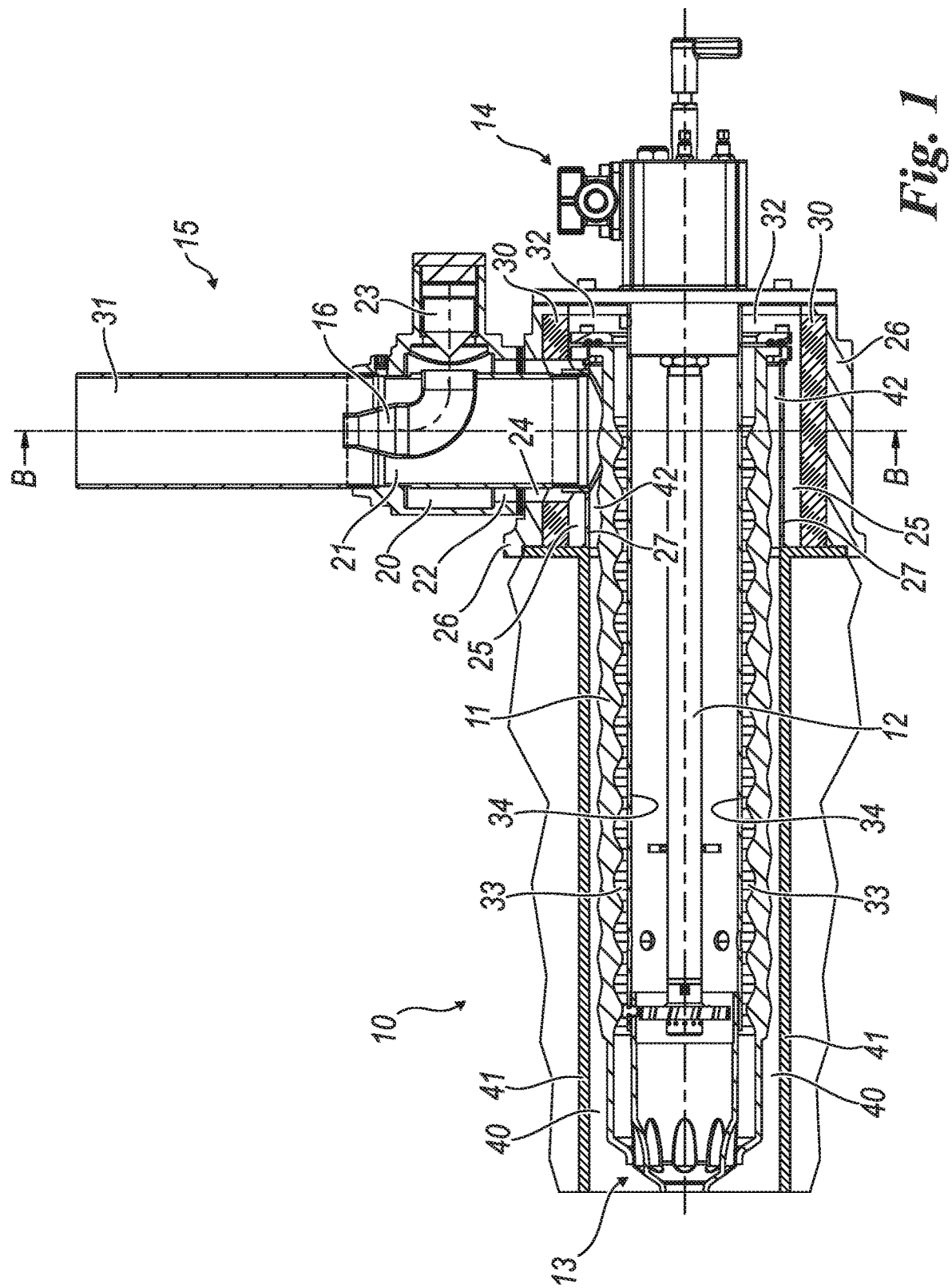
FIG. 1 shows a self-recuperative burner, seen laterally and in section, according to the present invention.
Figure 2:
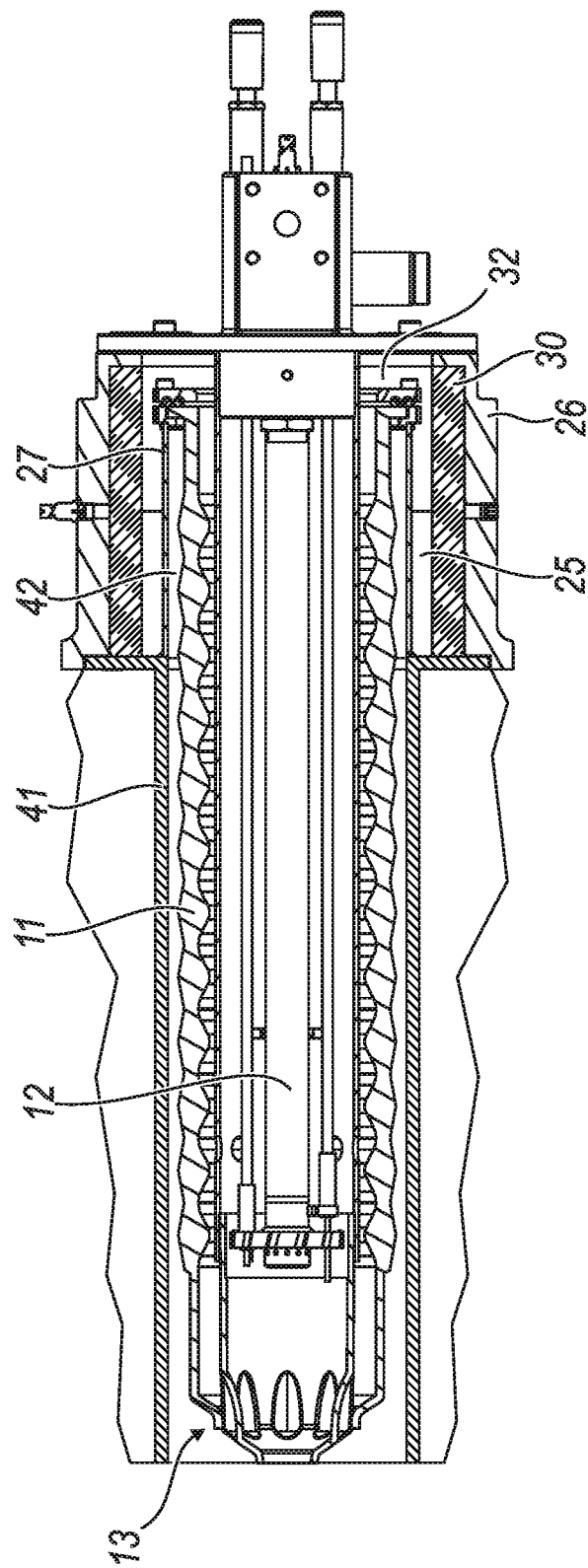
FIG. 2 shows a self-recuperative burner, from below and in section, according to the present invention.
Figure 3:
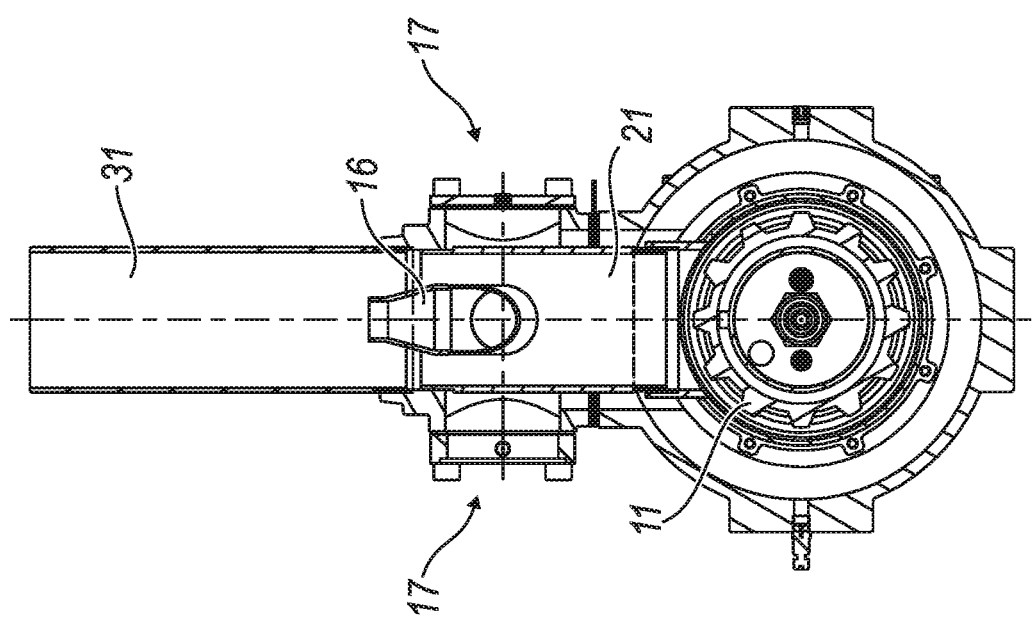
FIG. 3 shows a self-recuperative burner, seen from the rear and in section, according to the present invention.
Figure 4:
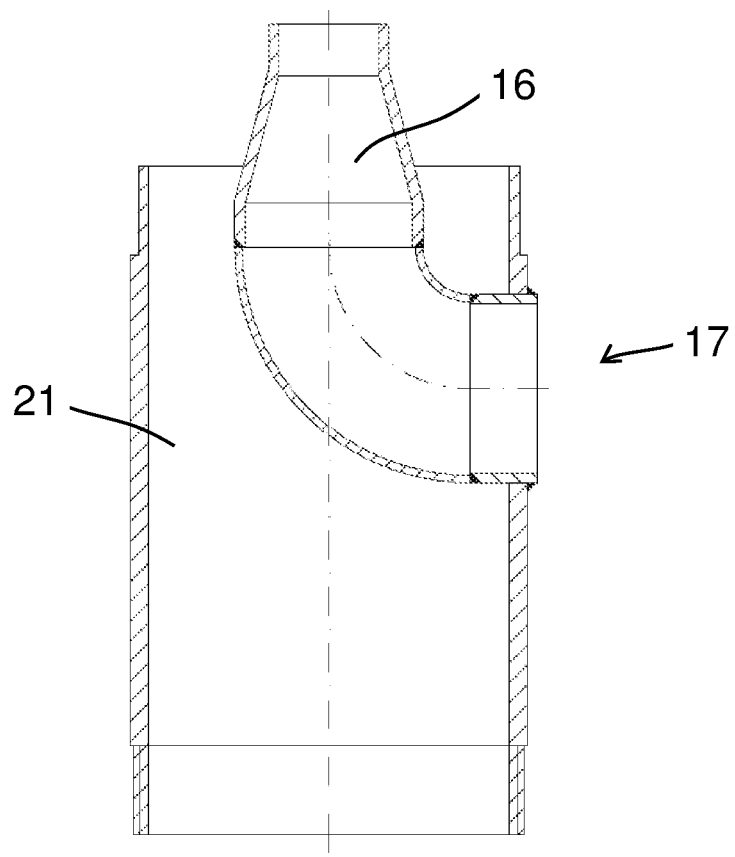
FIG. 4 shows a Venturi tube of a self-recuperative burner, seen laterally and in section, according to the present invention.
Figure 5:
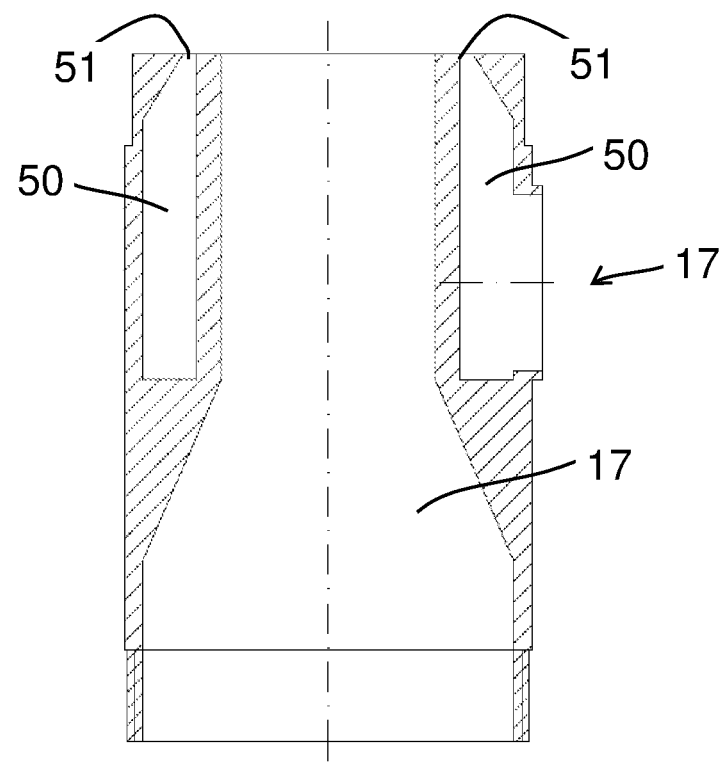
FIG. 5 shows a Venturi tube, in an alternative embodiment, of a self-recuperative burner, seen laterally and in section, according to the present invention.

Referring to the attached figures, a self-recuperative burner according to the present invention comprises a burner body 10 comprising an exchanger 11, and having inside it a gas supply pipe 12, and terminates in a burner head 13.

At the rear it comprises a block 14 which comprises the gas inlet and supports the exchanger 11 and the gas supply pipe 12.

Near the beginning of the exchanger 11 a flue gas discharge pipe 15 extends upwards; inside said pipe is a Venturi tube 16, and outside is an air intake 17, which can be positioned on the right or the left, with respect to the exchanger 11, since two opposite inlets are provided which can be used alternatively.

The air intake 17 is connected to a first annular chamber 20 which surrounds a first flue gas discharge pipe 21. The first annular chamber 20 is directly connected to the inlet of the Venturi tube 16.

The air intake 17 and the first annular chamber 20 are made in one single piece 22 which surrounds the first pipe 21.

Opposite the inlet of the Venturi tube 16, a valve 23 is provided which regulates the inflow of air into the Venturi tube 16.

The first annular chamber 20, descending towards the exchanger 11, is connected to a second annular chamber 24 (to the first pipe 21) which joins a third annular chamber 25 around the exchanger 11.

The second annular chamber 24 and the third annular chamber 25 are composed of an outer shell 26 and an inner shell 27 which initially and partially surrounds the exchanger 11.

The outer shell 26 is made of aluminium or cast iron and the inner shell 27 is made of steel or in any case heat-resistant material.

An insulator 30 is positioned adhering to the outer shell 26; said insulator delimits (externally) the third annular chamber 25, to guarantee external temperatures of around 50° C.

The first pipe 21 is fixed to the inner shell 27 by means of a coupling with washer.

A second upper pipe 31 is screw-fitted to the end of the first pipe 21.

The third annular chamber 25 comprises a passage 32 perpendicular to the exchanger 11 and communicates with a passage 33 which is in contact with the exchanger 11, positioned between it and a pipe 34 coaxial to the exchanger and internal to it.

The flue gases returning from the head 13 pass through a passage 40 external to and in contact with the exchanger 11, delimited externally by a further pipe 41. When the flue gases reach the vicinity of the flue gas discharge pipe 15, they pass into an annular chamber 42, which communicates with the first pipe 21, and alongside the Venturi tube 16 to reach the second pipe 31.

In an alternative embodiment of the Venturi tube 16, the first annular chamber 20, instead of being directly connected to the inlet of the Venturi tube 16, is connected to a further annular chamber 50, positioned inside the first pipe 21. The annular chamber 50 has at the top a narrowing in volume and forms a vertical and circular opening 51 which then leads into the second pipe 31, which substitutes and acts as the Venturi tube 16.

The flue gases coming from the annular chamber 42 pass inside the annular chamber 50, which is inside the first pipe 21, and proceed towards the second pipe 31.

In the first case the Venturi tube 16 is internal and the flue gases flow outside it, in the second case the corresponding Venturi tube 51 is external and the flue gases flow inside it.

The combustion air inlet, being concentric to the flue gas discharge, will already allow energy recovery at the air inlet on the valve body. Furthermore this solution also allows insertion at a height of another exchanger pipe if necessary, before the Venturi tube, thus elongating the heat exchange and increasing the burner efficiency.

The quantity of combustion air is regulated by means of an external valve not shown.

Any materials and dimensions can be used for the self-recuperative burner according to any one of the requirements and the state of the art.

The burner thus conceived is subject to numerous modifications and variations, all falling within the ambit of the inventive concept; furthermore all the details can be replaced by technically equivalent elements.

The invention claimed is:

1. A self-recuperative burner comprising: a burner body having an exchanger; said exchanger comprises a first duct for the combustion air and a second duct for the flue gases: at least one first flue gas discharge pipe and an air inlet duct leading to a first annular chamber concentric to said at least one first flue gas discharge pipe; said first annular chamber being connected also to a Venturi tube positioned inside said at least one first flue gas discharge pipe; wherein the burner comprises a second flue gas discharge pipe connected to an end of said first flue gas discharge pipe downstream of said Venturi tube, and the burner comprises a third flue gas exhaust pipe connected to an end of said first flue gas exhaust pipe upstream of said Venturi tube.

2. The burner according to claim 1 characterized in that said first annular chamber is connected to a second annular chamber concentric to said exchanger.

3. The burner according to claim 1 characterized in that said second annular chamber communicates with a first passage in contact with said exchanger; said first passage is positioned between said exchanger and a first pipe coaxial with said exchanger and internal thereto.

4. The burner according to claim 1 characterized in that it comprises a second passage in contact with said exchanger for the return flue gases; said second passage is positioned between said exchanger and a second pipe coaxial with said exchanger and external thereto.

5. The burner according to claim 1 characterized in that said first annular chamber exchanges heat with said at least one first flue gas discharge pipe.

6. The burner according to claim 2, characterized in that said first annular chamber and said second annular chamber are both composed of an outer shell and an inner shell which partially surrounds the exchanger.

7. The burner according to claim 6 characterised in that said outer shell is made of aluminium or cast iron and said inner shell is made of steel.

8. The burner according to claim 6 characterized in that the burner comprises an insulating material thermally adhered to said outer shell.

* * * * *